Patented Sept. 19, 1939

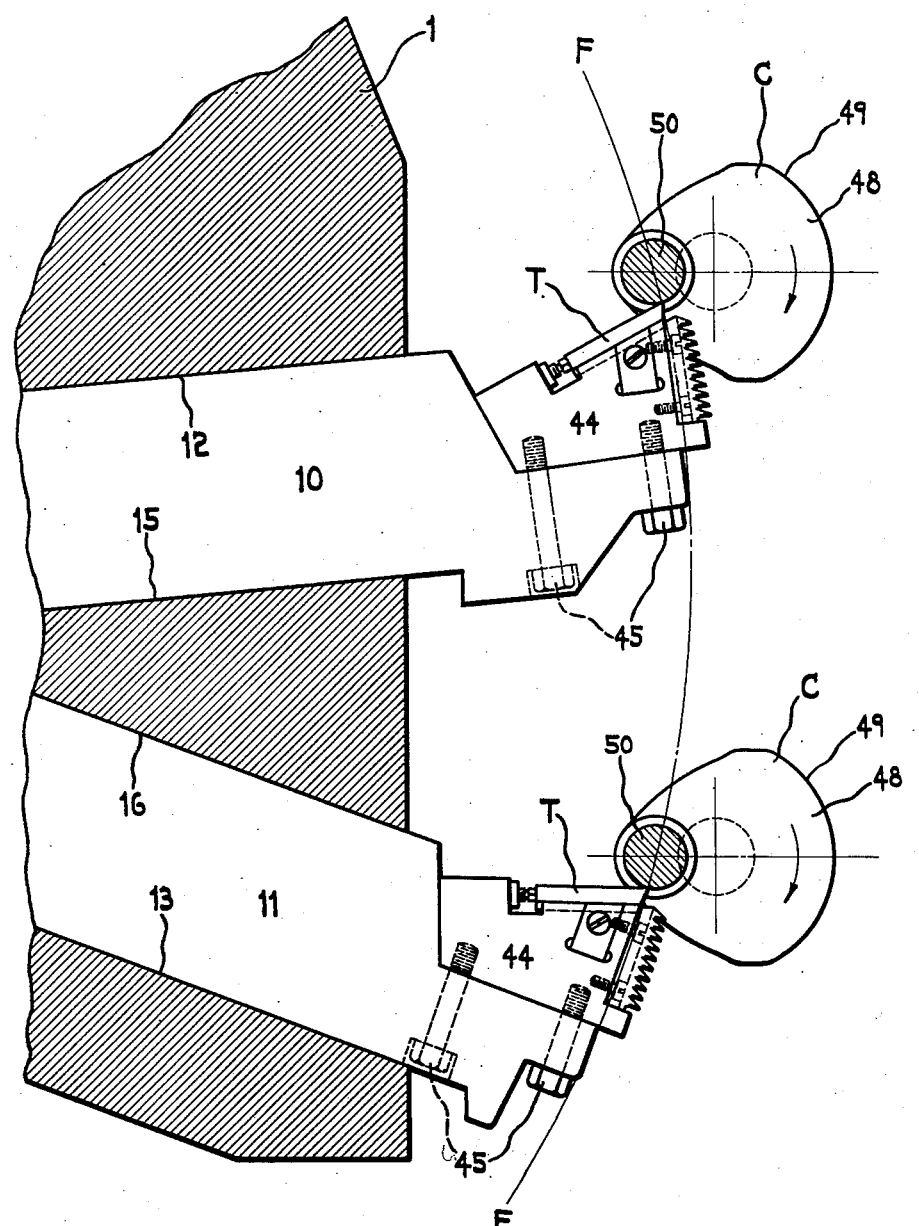

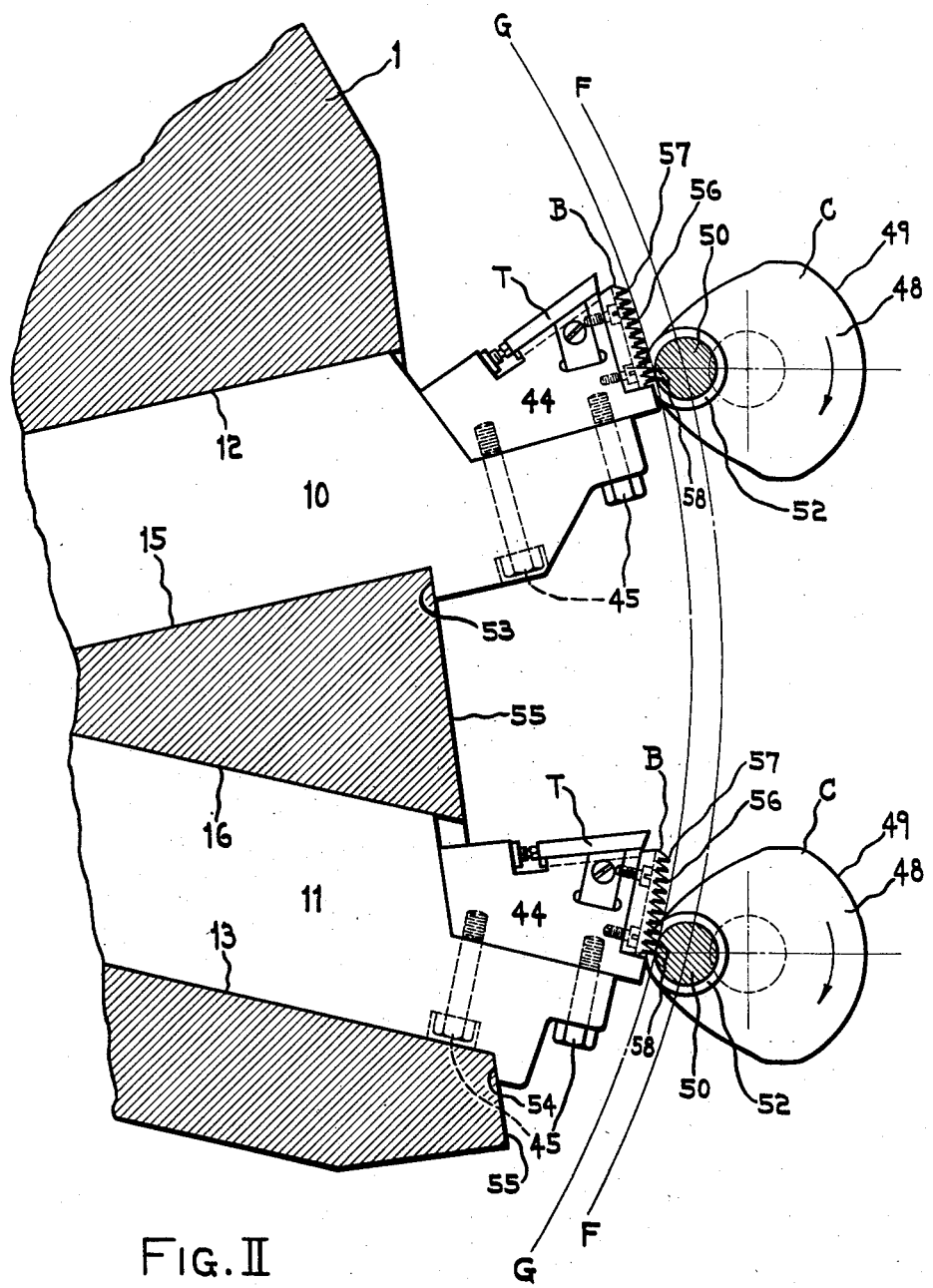
Fig. II

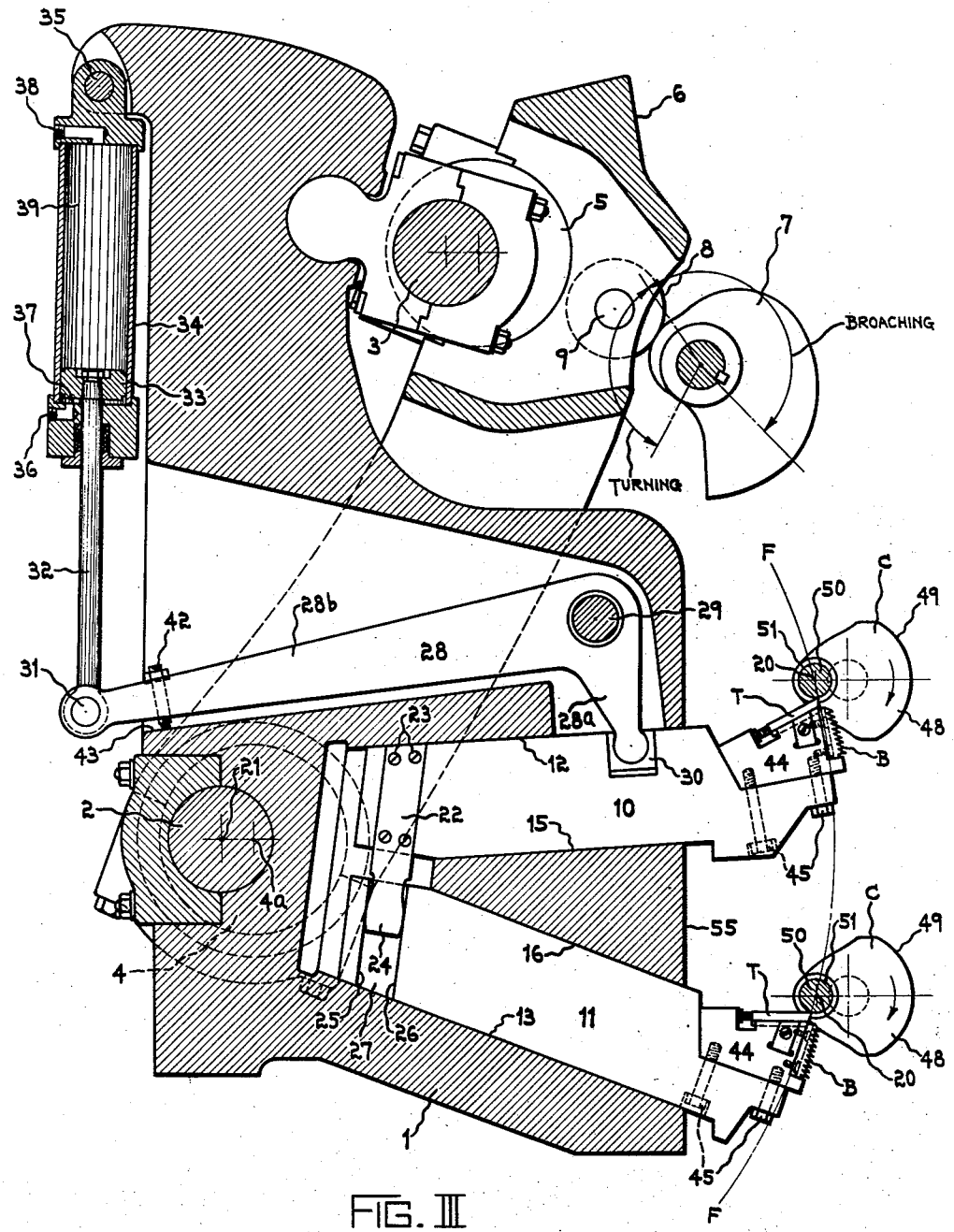
FIG. III

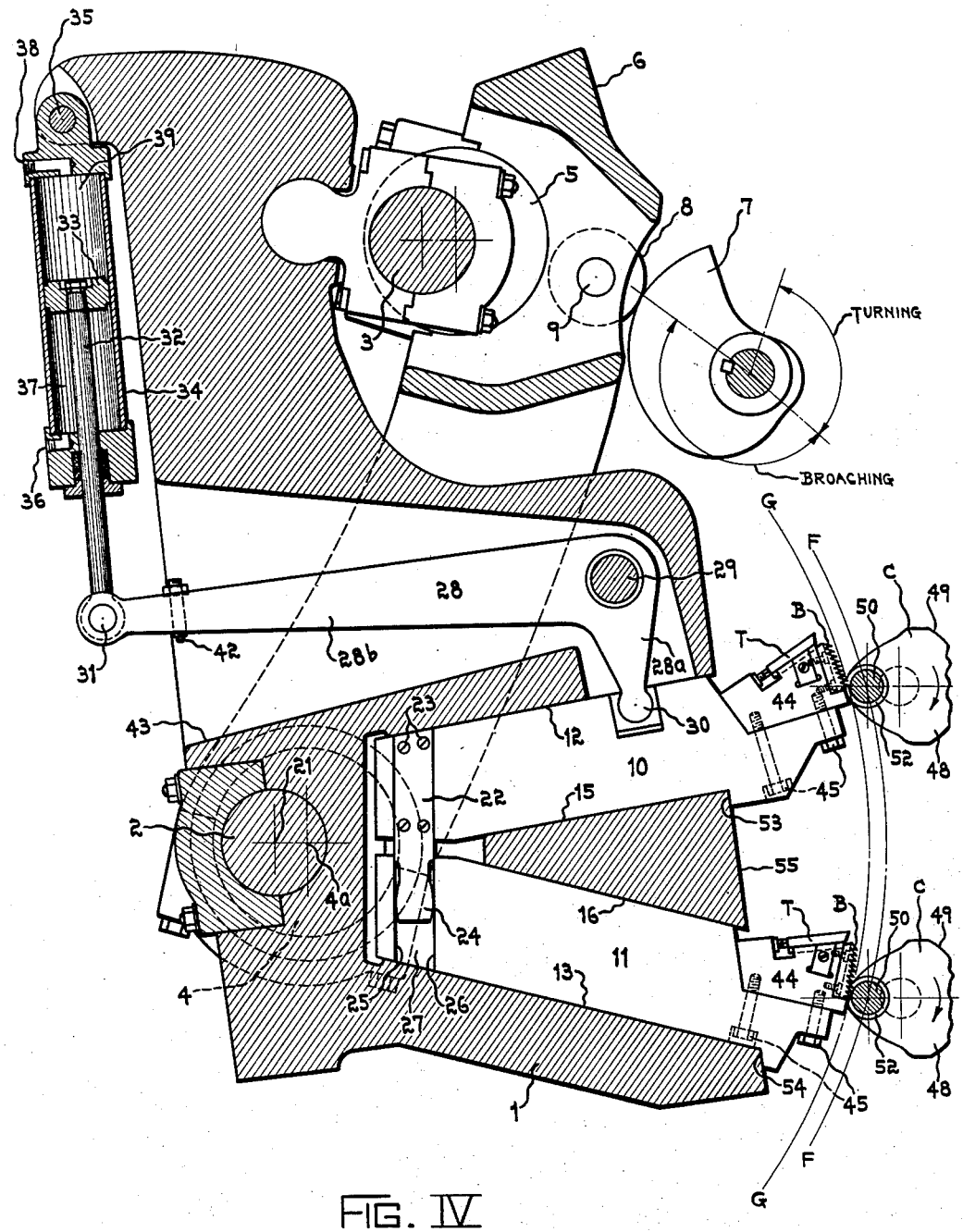
FIG. IV
INVENTOR.
WILLIAM F. GROENE
BY William S. Groene
ATTORNEY.

2,173,609

UNITED STATES PATENT OFFICE 2,173,609

COMBINED TURNING AND BROACHING TOOL FOR LATHES

William F. Groene, Cincinnati, Ohio, assignor to The R. K. Le Blond Machine Tool Company, Cincinnati, Ohio, a corporation of Delaware Application October 14, 1937, Serial No. 168,989

13 Claims. (Cl. 82—9)

This invention pertains to a novel tool for turning and broaching rotating work in a lathe. My invention is particularly well adapted to turning the bearing portions and associated areas of crankshafts for internal combustion engines.

For purposes of an exemplary disclosure I show my invention applied to an orbital lathe for turning the crank pins of crankshafts of a character shown in my Patent 1,934,530 issued November 7, 1933 and in my co-pending application Serial No. 122,349 filed January 26, 1937 in which lathes are employed tool feed mechanism of a character set forth in my co-pending application Serial No. 141,133 filed May 6, 1937.

An object of my invention is to provide in a lathe means for feeding a cutting tool to a rotating work piece in the lathe and then at the completion of the cutting of said tool to rapidly substitute a broach to further machine the area turned by said cutting tool.

Another object is to provide in a lathe having tool feeding mechanism, a cutting tool and a broach and means for rapidly substituting the broach for the cutting tool during the operation of the feeding mechanism whereby a work surface may be rough and finish machined in a single continuous operation.

Another object is to provide in a lathe having arcuately moving tool feeding mechanism, a cutting tool and a broach mounted on a movable member carried by said feeding mechanism which movable member may be rapidly actuated for substituting the broach for the cutting tool during swinging of said feeding mechanism for rough and finish machining a work surface in a single continuous operation.

Another object is to provide in a lathe a cutting tool and broaching cutter an arrangement wherein the cutting tool and broaching cutter may be progressively applied to a work piece in such a way that substantially no time be lost in substituting one for the other during the machining cycle.

Other features of my invention will be pointed out in the following description of the drawings in which:

Figure I is an elevation partly in section of a portion of a tool carrier unit of an orbital crank pin lathe incorporating my invention, particularly showing the relative position of the tools and broaches and work piece at the completion of the roughing operation and just at the instant of presentation of the finishing broaches to cutting position.

Figure II is an elevation partly in section of a portion of a tool carrier unit of an orbital crank pin lathe of Figure I but showing the relative position of the tools and broach and the work piece at the completion of the finish broaching operation with the machining operations completed on the crankshaft.

Figure III is an elevation partly in section of a tool carrier unit of an orbital crank pin lathe incorporating my invention, particularly showing the relative position of the tools, broaches, and work pieces at the completion of the turning operation and just at the instant of presentation of the broaches to cutting position.

Figure IV is an elevation partly in section of the tool carrier unit of Figure III but showing the relative position of the tools, broaches, and work pieces at the completion of the broaching operation with the machining operations completed on the crankshaft.

My invention is shown applied to an orbitally moving tool carrier 1 which is arranged for orbital movement and for arcuate feeding in a manner set forth in my Patent 2,148,293, dated February 21, 1939. The tool carrier 1 is so arranged as to feed the cutting tools T carried on said unit in the arcuate line of feeding F—F and to feed the broaching cutters B in the arcuate line of feeding G—G.

The orbitally moving tool carrier unit 1 is mounted on the crank pins 2 and 3 of the usual master crankshafts 4 and 5 respectively, the upper master crankshaft 5 being carried in the usual cradle 6 for swinging about the axis of rotation 4a of the lower master crankshaft 4 for appropriately swinging the tool carrier 1 to effect a feeding of cutting tools T and broaches B carried on said unit in the respective arcuate lines of feeding F—F and G—G in a manner fully set forth and described in my co-pending application and Patent 1,934,530 referred to above. The cradle 6 may be actuated in swinging movement for various types of feeding purposes by the rotary feeding cam 7 which contacts the roller 8 rotatably mounted on the stud 9 fixed in the cradle 6 in a manner also as fully set forth in said co-pending application above.

Slidably mounted in the tool carrier unit 1 are the tool bars 10 and 11 which are confined axially of the crankshaft C by appropriate means in the units 1 and which slide on the surfaces 12, 13, 15, and 16 of said unit. Means are also provided for rapidly actuating and for accurately positioning the bars 10 and 11 as also shown in that application.

Preferably the tool bar for each work piece C should be arranged to slide in a line substantially parallel to a plane passing through the axis of rotation 20 of the work surface to be machined and the axis of swinging 21 of the unit 1 about the crank pin 2 of the lower master crankshaft 4 or substantially perpendicular to the line of feeding direction to thereby facilitate presenting various different tools T to the crankshaft C with a minimum disturbance of normal feeding movement along the line F—F. It is also preferable to have the tool bars 10 and 11 slidable perpendicular to the axes 20 of the crank pins to be machined so as to provide proper access of the cutting tools T and broaches B to the work surfaces to be machined.

Inter-connecting means are provided between the bars 10 and 11 so that they both may be moved simultaneously by actuating one of the bars, as for example the bar 10. The inter-connecting means comprises a bar 22 fixed to the tool bar 10 by screws 23 which has a rounded end 24 adapted to engage the sides 25 and 26 of the slot 27 formed in the tool bar 11 whereby sliding movement of the tool bar 10 will cause similar sliding movement in the tool bar 11 even though the bars 10 and 11 do not slide in parallel paths.

Means are provided for actuating the bars 10 and 11 in sliding motion comprising a bell crank 28 pivotally mounted on a pin 29 fixed in the tool carrier unit 1 and having one of its arms 28a engaging the tool bar 10 by a suitable pivotal connection 30. The other arm 28b of the bell crank 28 is pivotally connected by a suitable pin 31 to a piston rod 32 of a reciprocatable piston 33 carried in a cylinder 34 pivotally mounted on the tool carrier unit 1 by a suitable pin 35. A passageway 36 connects with the piston rod chamber 37 and a passageway 38 connects with the piston head chamber 39 whereby fluid pressure may be applied to either of said chambers for reciprocating the piston 33 and thereby the tool bars 10 and 11. Means are provided for accurately positioning the tool bars 10 and 11 comprising integral abutments 53 and 54 formed on the respective tool bars 10 and 11 which abut against the face 55 on the tool carrier unit 1 to limit inward travel of the bars and an adjustable means 42 normally fixed in the arm 28b of bell crank 28 which is adapted to abut against a suitable surface 43 of the tool carrier unit 1.

Mounted on each of the tool bars 10 and 11 are tool holders 44 by appropriate bolts 45, each of the tool holders carrying cheeking and roughing tools T and finish broaching cutters B. The tools T are adapted to machine the cheeks 48 of the webs 49 and to rough turn the crank pin 50 of crankshafts C, said tools being maintained in the arcuate path F—F and fed toward the work along said path. When the roughing tools T are put in operation the bars 10 and 11 are extended outward (to the right in Fig. I) from the tool carrier unit 1.

The broaching cutters B are adapted to finish broach the crank pins 50 and accurately trim the faces of the fillets 52 associated therewith when these broaches are brought into the arcuate path G—G (Fig. II) and fed toward the work along said path. The broaching cutters B as shown in the drawings have their teeth 56 stepped or not located in the true arcuate path G—G of broaching feed so that when the bars 10 and 11 are withdrawn into the carrier 1 with their abutments 33 and 54 of the respective bars 10 and 11 against the face 55 of the unit 1 and said unit swung in arcuate feeding movement of the crank pin will be progressively machined to finished dimensions by the presentation of the work to each tooth of the broach. The first cutting tooth 57 does not project toward the axis of rotation of the work as far as the final cutting teeth 58 which lie in the arcuate path G—G for final finishing.

It is not necessary to step the teeth 56 of the broaching cutter relative to the arcuate path of feeding G—G. In such instances the progressive cutting of each broach tooth 56 on the work piece is accomplished by slowly moving the tool bars 10 and 11 outward (to the right in Fig. II) to a predetermined position for accurately sizing the work during the arcuate feeding movement of the unit 1.

It is to be clearly understood that it is not necessary to have the tools T alike for both upper and lower work pieces C nor to have the broaching cutters B alike. Different operations may be simultaneously undertaken on each of the work pieces C when either tools T or broaching cutters B are in cutting position.

The mode of operation of this arrangement is as follows: At the beginning of the machining cycle the tool carrier unit 1 is swung forwardly and downwardly to the right, Fig. I, with the tool bars 10 and 11 thrust outwardly to the right to bring the cutting tools T in the arcuate feeding path F—F. The unit 1 is then swung upwardly or counter-clockwise to feed said tools to the work to machine the cheeks 48 and rough turn the crank pins 50.

When this part of the cycle has been completed the tool bars 10 and 11 are rapidly drawn into the unit 1 bringing the broaching cutters into their arcuate path of feeding G—G as the swinging feeding movement of the unit 1 continues, the advantage of this arrangement being that substantially no time is lost in substituting the broaching cutter for the roughing tool during the machining cycle, the broaching cutter being ready to go to work immediately upon completion of the work of the roughing tool. In instances where the broach teeth are stepped relative to the path of feeding the continued swinging of the unit 1 with bars 10 and 11 held in fixed withdrawn position will cause the completion of the machining operation. However, in instances where the broach teeth are not so stepped, the bars 10 and 11 are moved slowly outward from their retracted position in the unit 1 during this later part of the swinging feeding movement of the unit, the bars reaching a predetermined position of outward movement just as the final cutting teeth 58 engage the work for final accurate sizing of the work. In this latter arrangement the tool bars 10 and 11 are again withdrawn into the unit 1 at the completion of the cutting operation and just before the unit 1 swings downward to initial starting position so as to clear the broaching cutters from contact with the work during this return movement of the unit to thus prevent scaring or damaging the finished work surface.

Having fully set forth and described my invention what I claim is:

1. In a lathe, a rotatable work holder, a tool carrier movable relative to a work piece in said work holder, a cutting tool and a broach mounted on said carrier, means for moving said carrier in feeding movements, and means for selectively presenting said cutting tool or said broach to said work piece.

2. In a lathe, a rotatable work holder, a tool carrier movable relative to a work piece in said work holder, a cutting tool and a broach mounted on said carrier, means for moving said carrier in feeding movements, and means for rapidly substituting said broach for said cutting tool during said feeding movements.

3. In a lathe, a rotatable work holder, a tool carrier movable in a predetermined arcuate path relative to a work piece in said work holder, a cutting tool and a broach mounted on said carrier, means for moving said carrier in feeding movements, and means for moving said cutting tool and said broach in a direction substantially radial of said arcuate path for selectively presenting said cutting tool or said broach to said work piece.

4. In a lathe, a rotatable work holder, a tool carrier movable in a predetermined path relative to a work piece in said work holder, a cutting tool and a broach mounted on said carrier, means for moving said carrier in feeding movements, and means for moving said cutting tool and said broach in a direction substantially perpendicular to said path for selectively presenting said cutting tool or said broach to said work piece.

5. In an orbital lathe, an orbitally moving tool carrier unit adapted to be swung relative to work pieces in said lathe, tool bars slidably mounted for movement in different directions in said unit, a cutting tool and a broach mounted on each of said bars, means on said unit for simultaneously sliding said bars whereby the tool or broach on each of said bars may be rapidly presented to said work piece, and means for swinging said unit for causing simultaneous relative feeding of said tools and broaches and said work pieces.

6. In an orbital lathe, an orbitally moving tool carrier unit adapted to be swung relative to a work piece in said lathe, a tool bar slidably mounted in said unit, a tool and broach mounted on said bar, means on said unit for sliding said bar whereby said tool or broach may be rapidly presented to said work piece, and means for swinging said unit for causing a relative feeding of said tools and said work piece.

7. In a lathe, a cutting tool, means for feeding said cutting tool radially of the axis of rotation of a work piece in said lathe, a broach, means for feeding said broach tangentially of the work surface being machined, and means for selectively applying the cutting tool or the broach to said work piece during the continuous operation of said feeding means.

8. In a lathe, a cutting tool, means for feeding said cutting tool along an arcuate path radially of the axis of rotation of a work piece in said lathe, a broach having teeth arranged in an arcuate path of broach travel substantially tangent to the work surface being machined, means for feeding said broach in said path of broach travel, and means for selectively applying the cutting tool or the broach to said work piece during the continuous operation of said feeding means.

9. In a lathe, a tool carrier, means for feeding said tool carrier in a predetermined path of travel relative to a work piece in said lathe, a tool holder on said carrier movable in a plane substantially perpendicular to said path of travel, a cutting tool on said tool holder adapted to engage a work piece in said lathe when said holder is in one position, a broach on said holder adapted to engage said work piece when said holder is in another position, means for actuating said carrier in feeding movements, and means for moving said tool holder.

10. In a lathe, a cutting tool, means for feeding said cutting tool along an arcuate path radially of the axis or rotation of a work piece in said lathe, a broach having teeth arranged in a stepped series relative to an arcuate path of broach travel substantially tangent to the work surface being machined, means for feeding said broach in said path of broach travel, and means for selectively applying the cutting tool or the broach to said work piece during the continuous operation of said feeding means.

11. In a lathe, a cutting tool, means for feeding said cutting tool along an arcuate path radially of the axis or rotation of a work piece in said lathe, a broach having teeth arranged in an arcuate path of broach travel substantially tangent to the work surface being machined, means for feeding said broach along said path of broach travel, means for selectively applying the cutting tool or the broach to said work piece, and means for moving said broach toward the work piece during the feeding of said broach along said path of broach travel.

12. In a lathe, a tool carrier, means for feeding said tool carrier relative to a work piece in said lathe, a tool bar slidably mounted in said tool carrier, means for moving said tool bar, means for limiting the extent of said movement of said tool bar, a cutting tool mounted on said tool bar adapted to be positioned in cutting position when said tool bar is moved to the limit of its travel in one direction, a broach mounted on said tool bar adapted to be positioned in cutting position when said bar is moved to the limit of its travel in the other direction, both said cutting tool or said broach being fed toward said work by the feeding of said carrier when in their respective cutting positions.

13. In a lathe, a tool carrier, means for feeding said tool carrier relative to a work piece in said lathe, a tool bar slidably mounted in said tool carrier, a cutting tool and a broach mounted on said tool bar, and means for moving said tool bar for positioning the cutting tool or the broach in cutting position and for moving said broach toward the work piece when said tool carrier is operating in feeding movement.

WILLIAM F. GROENE.